United States Patent [19]

Heflin et al.

[11] Patent Number: 5,306,121
[45] Date of Patent: Apr. 26, 1994

[54] COMPRESSOR TIERED MOUNTING ARRANGEMENT

[75] Inventors: Christopher Heflin; Ronald G. McFarland; Louis J. Sullivan, all of Indianapolis, Ind.

[73] Assignee: Carrier Corporation, Syracuse, N.Y.

[21] Appl. No.: 51,332

[22] Filed: Apr. 23, 1993

[51] Int. Cl.⁵ .............................................. F04B 39/12
[52] U.S. Cl. ...................................... 417/363; 248/638
[58] Field of Search ................... 417/363; 62/295; 248/638

[56] References Cited

U.S. PATENT DOCUMENTS

| 2,711,285 | 6/1955 | Burrowes | 417/363 X |
|---|---|---|---|
| 3,785,167 | 1/1974 | Sahs | 417/363 X |
| 4,132,194 | 1/1979 | Saito . | |
| 4,834,336 | 5/1989 | Shimazaki et al. . | |
| 4,946,351 | 8/1990 | Richardson, Jr. . | |
| 4,984,971 | 1/1991 | Bergeron | 417/363 |
| 4,993,682 | 2/1991 | Imai et al. . | |
| 5,030,068 | 7/1991 | Jacobs et al. . | |
| 5,040,953 | 8/1991 | Tinsler | 417/363 |
| 5,141,201 | 8/1992 | Mizuno | 248/638 X |
| 5,221,192 | 6/1983 | Heflin et al. | 417/363 |

FOREIGN PATENT DOCUMENTS

| 533917 | 9/1931 | Fed. Rep. of Germany | 62/295 |
|---|---|---|---|
| 1264095 | 5/1961 | France | 417/363 |
| 238181 | 9/1990 | Japan | 417/363 |

Primary Examiner—Richard E. Gluck

[57] ABSTRACT

A tiered mounting arrangement supports a compressor on a mounting plate which is in turn supported to the base pan of the system. Elastomeric isolators support the mounting plate above the base pan and similar elastomeric isolators support the compressor above the mounting plate. The isolator studs function to isolate compressor vibration from being transmitted to the mounting plate, and to isolate vibration in the mounting plate from being transmitted to the base pan. This arrangement achieves significant reduction in noise levels.

5 Claims, 3 Drawing Sheets

COMPRESSOR TIERED MOUNTING ARRANGEMENT

BACKGROUND OF THE INVENTION

This invention relates generally to compressors for refrigeration, air conditioners, or heat pumps, and is more particularly concerned with a vibration-isolating mounting assembly for mounting the compressor to its associated base pan.

It is customary in the design of air conditioning systems to mount the refrigerant compressor to the base pan of the condensing or outdoor unit. In such an installation, it is desirable to silence the unit by damping vibrations caused by operation of the compressor. This can be accomplished by positioning elastomeric grommets between the base or feet of the compressor and the base pan on which it is mounted. The grommets are attached to the compressor feet and the compressor, with grommets, is set on the base pan. Threaded studs (with sleeves) are then pushed through the grommets and screwed into mounting holes in the base pan.

A recent improvement on this conventional mounting assembly is described in commonly-assigned U.S. Pat. No. 5,221,192, incorporated by reference herein. That approach recognizes that a rigid stud can transmit vibrations from the compressor to the base pan. This approach eliminates the "through bolt" structure of the conventional stud mount, instead employing a "sandwich" elastomeric isolator arrangement where upper and lower threaded steel stud sections are joined by an elastomeric middle section. This arrangement isolates vibration much better than the conventional stud and grommet technique, and also has a greater tolerance for lateral movement of the compressor, which transfers vibrational energy into heat energy.

However, the mounting arrangement, with the compressor mounted on these elastomeric isolators directly onto the base pan, still transmits more vibration to the base pan than is desirable, and it is likewise desired to reduce the sound levels associated with the outdoor unit. On the other hand, the mounting arrangement must still be rugged enough to withstand transit and to ensure trouble-free usage after installation.

OBJECTS AND SUMMARY OF THE INVENTION

It is therefore an object of the present invention to provide an improved arrangement for mounting a compressor to a base pan.

Another object of the present invention is improved isolation of vibration between a compressor and a base pan.

A further object of the present invention is increased lateral movement of a compressor with respect to a base pan to which it is attached.

Yet another object of the present invention is to provide a compressor mount assembly which achieves ease of manufacture, and is rugged and effective in use.

In accordance with an aspect of the present invention, an air conditioning or refrigeration assembly has its compressor supported on a mounting plate which is in turn supported by the base pan. The base pan is adapted to rest on a fixed surface. The compressor has a plurality of mounting feet, each of which has a mounting opening. The compressor feet are supported by a first group of elastomeric isolators to the mounting plate, which is provided with a first group of mounting holes in registry with the mounting openings of the compressor feet. Lower threaded portions of the elastomeric isolators are fitted into the mounting openings of the plate, and upper parts of the isolator are fitted into the mounting openings of the compressor. A second group of similar elastomeric isolators support the mounting plate above the base pan. The base pan is provided with mounting holes and the mounting plate has a second group of mounting holes in registry with the base pan mounting holes. The elastomeric isolator supports the mounting plate on the base pan with upper posts in the respective mounting holes of the second group and lower threaded portions in the associated base pan mounting holes.

This arrangement provides a tiered support which effectively isolates compressor vibration from the base pan, thus reducing noise. The elastomeric isolators prevent vibration from the compressor from being transmitted to the mounting plate, and then isolate vibration in the mounting plate from transmission to the base pan.

The mounting studs can be a grommet and through post arrangement, or preferably the sandwich arrangement U.S. Pat. No. 5,221,192. The mounting plate can be a square of sheet steel, with one or more chamfered corners. In an alternative construction, the mounting plate can be a laminate of metal and plastic resin construction, which further attenuates unwanted vibration.

The compressor can be first mounted onto the base pan with the first or upper set of isolator studs. Then the second set of isolator studs are inserted between the plate and the base pan. These studs pass through oversize or clearance holes in the plate, which permits alignment of the compressor and mounting plate on the base pan. Alternatively, the plate can be mounted on the base pan first using the lower isolator studs, and the compressor can be mounted with the upper isolator studs passing through clearance holes in the mounting plate to permit alignment of the compressor. Also preferably, the lower threaded portions of the studs are self-threading, and the associated mounting holes in the mounting plate and base pan are gripper holes, i.e., slightly undersize to form a female thread upon insertion of the self-threading stud lower portion.

Nuts can be used on the upper posts portions of the isolator studs to secure the mounting plate and the compressor feet.

This arrangement achieves a significant sound reduction without sacrifice of ruggedness and with minimal increased cost or weight.

A sound level test has revealed a sound reduction of between 1.5 and 5.0 dB as compared with a standard grommet mounting arrangement.

The above and many other objects features and advantages of this invention will become apparent from the ensuing description of a preferred embodiment, when read in conjunction with the accompanying Drawing.

DETAILED DESCRIPTION OF A PREFERRED EMBODIMENT

Figure 1:
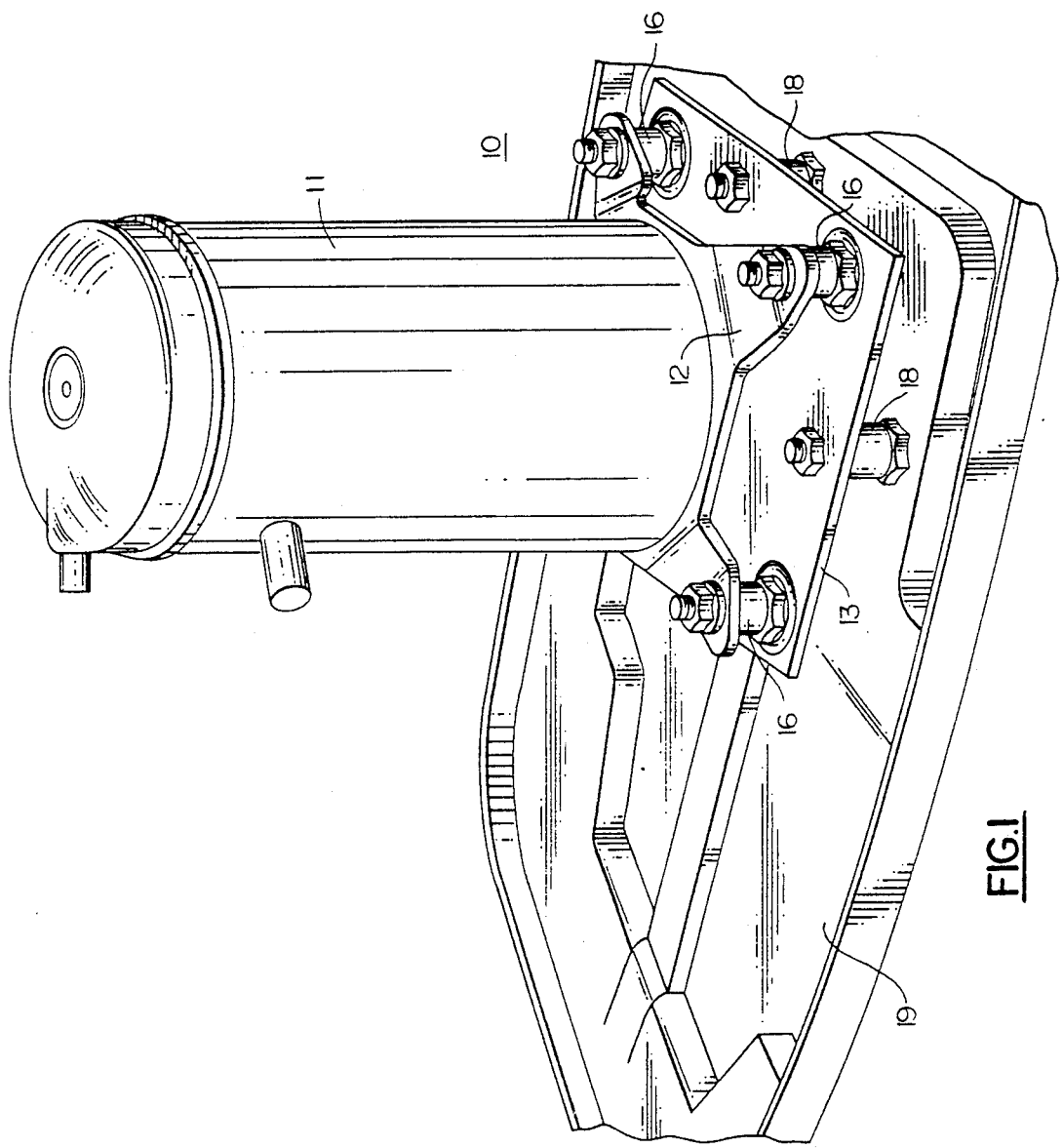
FIG. 1 is a perspective view of a compressor installation in accordance with one preferred embodiment of the invention.
Figure 2:
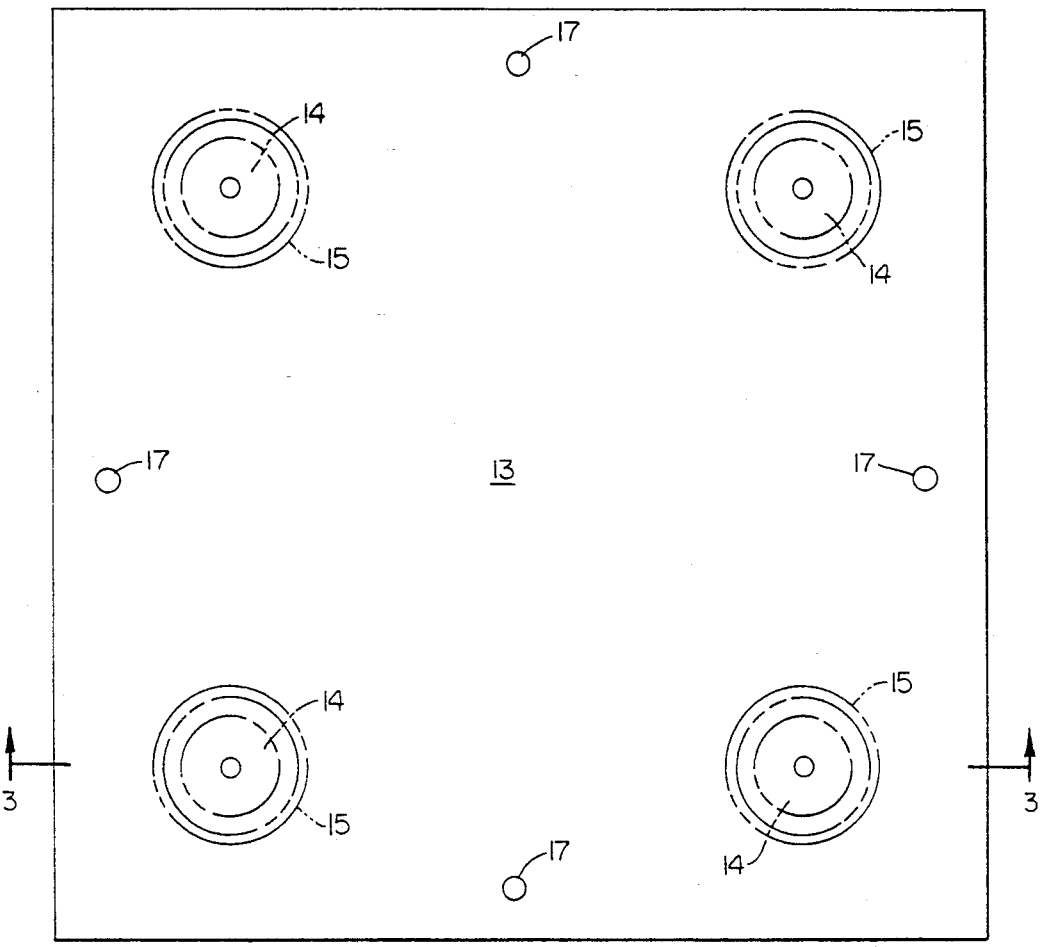
FIG. 2 is a plan view of the mounting plate of the embodiment of this invention.
Figure 3:
FIG. 3 is a view at 3—3 of FIG. 2.

With reference initially to FIG. 1 of the Drawing, an outdoor or condenser unit 10 of a split system condensing unit is shown, partly cut away. A compressor 11 has a plurality of flanges or feet 12 at its lower end; here there are four such feet 12 disposed at 90 degree intervals. The compressor is supported on a mounting plate 13 provided with mounting holes 14, as better shown in FIG. 2, disposed near corners of the plate 13. These holes 14 are gripper type mounting holes and are each surrounded by an annular embossment 15 (FIG. 3).

Returning to FIG. 1, there is a first or upper group of isolator studs 16, here of a sandwich configuration, which attach between the mounting holes 14 in the plate 13 and mounting openings in the associated feet 12 of the compressor. Here the isolators 16 have a lower self-tapping threaded portion which is screwed into snug engagement with the associated mounting hole 14. The studs also have an upper post portion which penetrates the mounting openings of the associated compressor foot 12 and is secured by a flanged nut. Between these portions is an elastomeric portion which supports the compressor 11 above the plate 13 and absorbs compressor vibration to isolate these two members to prevent the compressor vibrations from being transmitted to the mounting plate.

Figure 4:
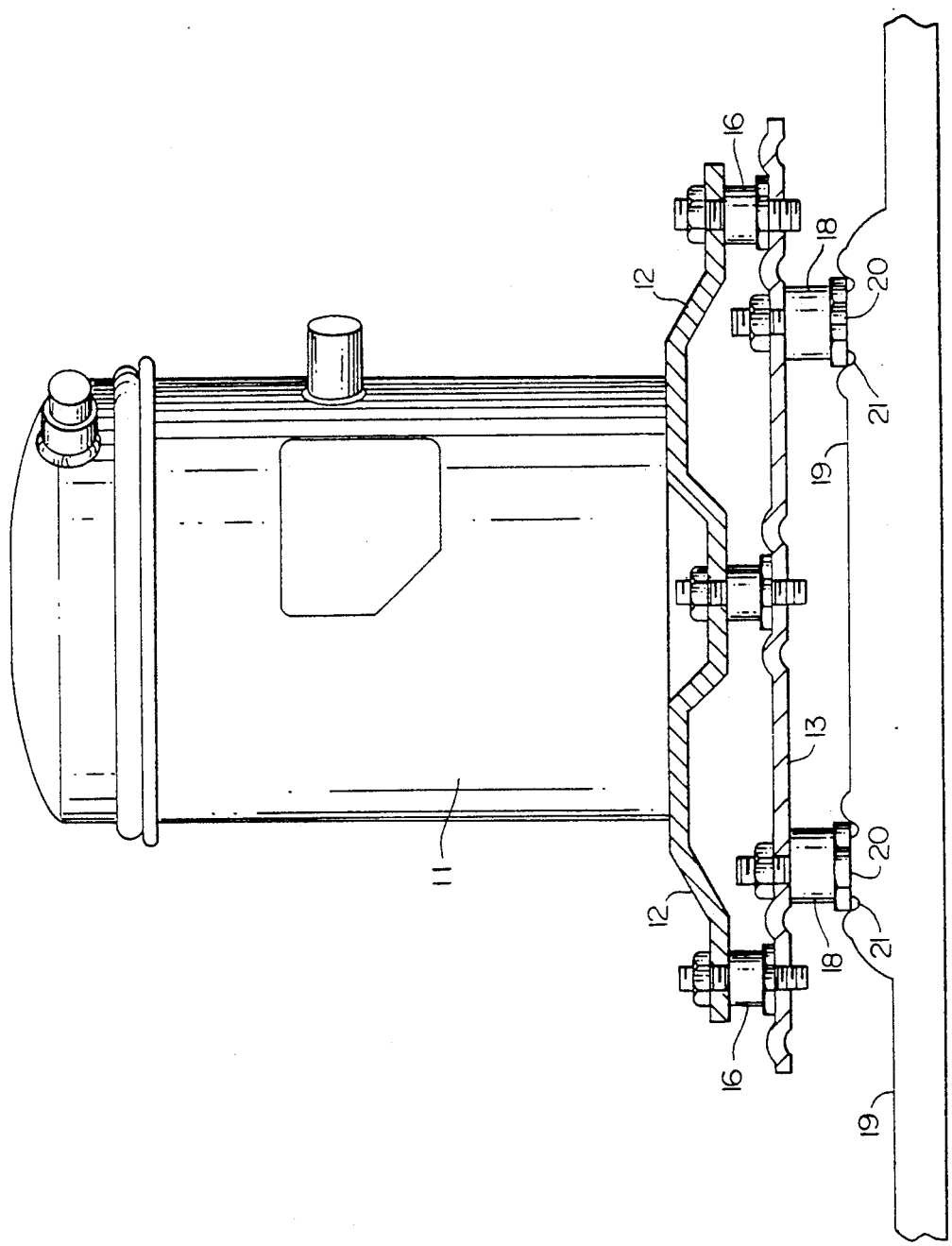
FIG. 4 is an elevation, partly in section, of the installation of FIG. 1.

The plate 13 also has a group of openings 17 situated at intervals between the mounting holes 14. A second group of isolator studs 18 is situated between the plate 13 and a base pan 19 of the unit 10. These studs 18 have an upper post section that passes through a respective one of the opening 17 and is secured by a flanged nut. The studs also have a lower portion which is secured to a respective mounting hole 20 in the base pan 19 in registry with associated mounting openings 17. The base pan openings 20 can also be surrounded by annular embossments 21, as shown in FIG. 4.

A tiered arrangement constructed according to this invention was tested in two orientations on a mechanical shaker, after which it was impacted on four sides at a velocity of 5.75 feet per second. These test conditions were considered to be more severe than conditions encountered in shipping or operation. Final inspection revealed no damage to any portion of the tiered mounting system, including all eight of the isolator studs 16 and 18.

Test comparisons were made with three compressors mounted using the tiered system of this invention and the same model compressors positioned with a standard grommet mounting arrangement. The three standard arrangements had measured sound levels of 7.19 Bels, 7.36 Bels, and 7.23 Bels, respectively, while the tiered arrangements had measured sound levels of 7.04 Bels, 6.86 Bels, and 7.02 Bels. This produced a sound reductions of 0.15, 0.50, and 0.21 Bels, i.e., 1.5, 5.0, and 2.1 dB.

Further sound reduction is possible by employing a laminate structure for the mounting plate 13. That is, the mounting plate can have a sandwich construction of alternate layers of metal and a plastic resin. This material absorbs and dissipates vibrational energy reaching the plate, further reducing the levels of vibration transmitted to the base plate. The base pan can also incorporate this sandwich construction material to reduce noise levels.

While this invention has been described with reference to a preferred embodiment, it should be understood that the invention is not limited to that embodiment. Rather, many modifications and variations would present themselves to those of skill in the art without departing from the scope and spirit of the invention, as defined in the appended claims.

What is claimed is:

1. Air conditioning or refrigeration assembly comprising a compressor having a plurality of mounting feet with mounting openings therein; a base pan on which said compressor is mounted; a mounting plate situated between said compressor and said base pan and having a first group of mounting openings in registry with mounting openings of the compressor feet and a second group of mounting openings; a first plurality of elastomeric isolator stud means each secured to a respective one of said first group of mounting openings and to an associated one of the mounting openings of said compressor feet for supporting said compressor upon said plate while functioning to isolate vibration from being transmitted from the compressor to the mounting plate; and a second plurality of elastomeric isolator means each secured to said base pan and to an associated one of said second group of mounting openings of said mounting plate to support said mounting plate on said base pan while functioning to isolate vibration from being transmitted from the mounting plate to the base pan, the base pan adapted to rest on a fixed surface.

2. The assembly of claim 1 wherein said mounting plate is a flat plate of metal.

3. The assembly of claim 1 wherein said mounting plate is a laminate of metal and polymer layers.

4. The assembly of claim 1 wherein said first elastomeric isolator means each include a lower stud section for threadable engagement into the respective one of the first group of mounting holes in said mounting plate; an upper stud section extending upwardly into the mounting opening of the associated compressor foot; and an elastomeric middle section secured to said lower isolator section and to said upper isolator section.

5. The assembly of claim 1 wherein said second elastomeric isolator means each include a lower stud section for threadable engagement into a respective mounting hole in said base span; an upper stud section extending upwardly into the associated one of said second group of mounting openings in said mounting plate; and an elastomeric middle section secured to said lower stud section and said upper stud section.

* * * * *